(12) United States Patent
Hashimoto

(10) Patent No.: US 12,454,009 B2
(45) Date of Patent: Oct. 28, 2025

(54) CUTTING TOOL, DATA COLLECTION SYSTEM, AND CUTTING TOOL HOLDER

(71) Applicant: KYOCERA CORPORATION, Kyoto (JP)

(72) Inventor: Shigetaka Hashimoto, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 839 days.

(21) Appl. No.: 17/633,175

(22) PCT Filed: Aug. 4, 2020

(86) PCT No.: PCT/JP2020/029793
§ 371 (c)(1),
(2) Date: Feb. 4, 2022

(87) PCT Pub. No.: WO2021/025011
PCT Pub. Date: Feb. 11, 2021

(65) Prior Publication Data
US 2022/0274183 A1    Sep. 1, 2022

(30) Foreign Application Priority Data
Aug. 5, 2019   (JP) ................................. 2019-143677

(51) Int. Cl.
*B23B 27/14*    (2006.01)
*B23B 29/12*    (2006.01)
*B23Q 17/09*    (2006.01)

(52) U.S. Cl.
CPC .............. *B23B 27/14* (2013.01); *B23B 29/12* (2013.01); *B23Q 17/09* (2013.01)

(58) Field of Classification Search
CPC ............ B23B 27/14; B23B 2260/1285; B23B 2260/128; B23B 29/12; B23B 29/125;
(Continued)

(56) References Cited

U.S. PATENT DOCUMENTS

| 4,555,955 A | * | 12/1985 | Morgan | ................ G01L 5/1627 |
| | | | | 73/862.06 |
| 5,197,720 A | * | 3/1993 | Renz | ..................... B23B 31/117 |
| | | | | 269/48.1 |

(Continued)

FOREIGN PATENT DOCUMENTS

| CN | 102873353 A | 1/2013 | |
| CN | 103111642 A | * | 5/2013 | ........... B23Q 17/098 |

(Continued)

*Primary Examiner* — Nicole N Ramos
(74) *Attorney, Agent, or Firm* — HAUPTMAN HAM, LLP

(57) ABSTRACT

A cutting tool may include a base body, a tip, a sensor, and a cover. The base body may have a shank portion extending in a first direction, a fixation portion, and a recess opening at an outside surface of the shank portion. The tip may be fixed to the fixation portion and may have a cutting edge. The sensor may be positioned inside the recess. The cover may close the recess. Among peripheral surfaces of the shank portion, a first area may face one side in a second direction that is a direction orthogonal to the first direction, and the cutting edge may be positioned further toward the one side in the second direction from the first area. The entirety of the cover may be positioned further toward the other side in the second direction from the cutting edge.

17 Claims, 9 Drawing Sheets

(58) Field of Classification Search
CPC .......... B23Q 17/0971; B23Q 17/0985; B23Q 17/09; B23Q 17/0952; B23Q 17/0966; B23Q 17/12; B23Q 2717/003
See application file for complete search history.

(56) References Cited

U.S. PATENT DOCUMENTS

| | | | | |
|---|---|---|---|---|
| 5,722,803 | A * | 3/1998 | Battaglia | B23B 27/146 407/115 |
| 7,591,209 | B2 * | 9/2009 | Murakami | B23B 29/022 82/158 |
| 10,967,434 | B2 * | 4/2021 | Fenollosa | B23B 29/03403 |
| 2002/0083805 | A1 * | 7/2002 | Lundblad | F16F 15/005 82/163 |
| 2006/0085092 | A1 * | 4/2006 | Redecker | B23Q 17/098 700/174 |
| 2006/0159533 | A1 * | 7/2006 | Zeiler | B23B 49/006 408/226 |
| 2009/0072502 | A1 * | 3/2009 | Weller | B23B 31/2073 702/41 |
| 2009/0175694 | A1 * | 7/2009 | Craig | B23B 51/00 700/173 |
| 2016/0045994 | A1 | 2/2016 | Jayr et al. | |
| 2017/0082506 | A1 * | 3/2017 | Ting | B23Q 17/0966 |
| 2017/0209974 | A1 * | 7/2017 | Angel | B23Q 17/0971 |
| 2018/0178293 | A1 * | 6/2018 | Yamamoto | B23G 5/00 |
| 2019/0001456 | A1 * | 1/2019 | Kalhori | B23Q 17/0952 |
| 2019/0299352 | A1 | 10/2019 | Michiwaki | |
| 2023/0182214 | A1 * | 6/2023 | Kuriyama | B23Q 17/12 82/121 |

FOREIGN PATENT DOCUMENTS

| | | | |
|---|---|---|---|
| CN | 108856752 A | 11/2018 | |
| DE | 102007036002 A1 * | 2/2009 | ........... B23B 29/04 |
| EP | 2050535 A1 * | 4/2009 | ........... B23B 29/04 |
| EP | 3282587 A1 | 2/2018 | |
| FR | 2922129 A1 * | 4/2009 | ........... B23B 29/04 |
| JP | S5779431 A | 5/1982 | |
| JP | 201220359 A | 2/2012 | |
| JP | 2013026506 A | 2/2013 | |
| WO | WO-2015011489 A1 * | 1/2015 | ........ B23Q 17/0966 |
| WO | WO-2018029308 A1 * | 2/2018 | ....... B23B 29/03403 |
| WO | 2018047834 A1 | 3/2018 | |

* cited by examiner

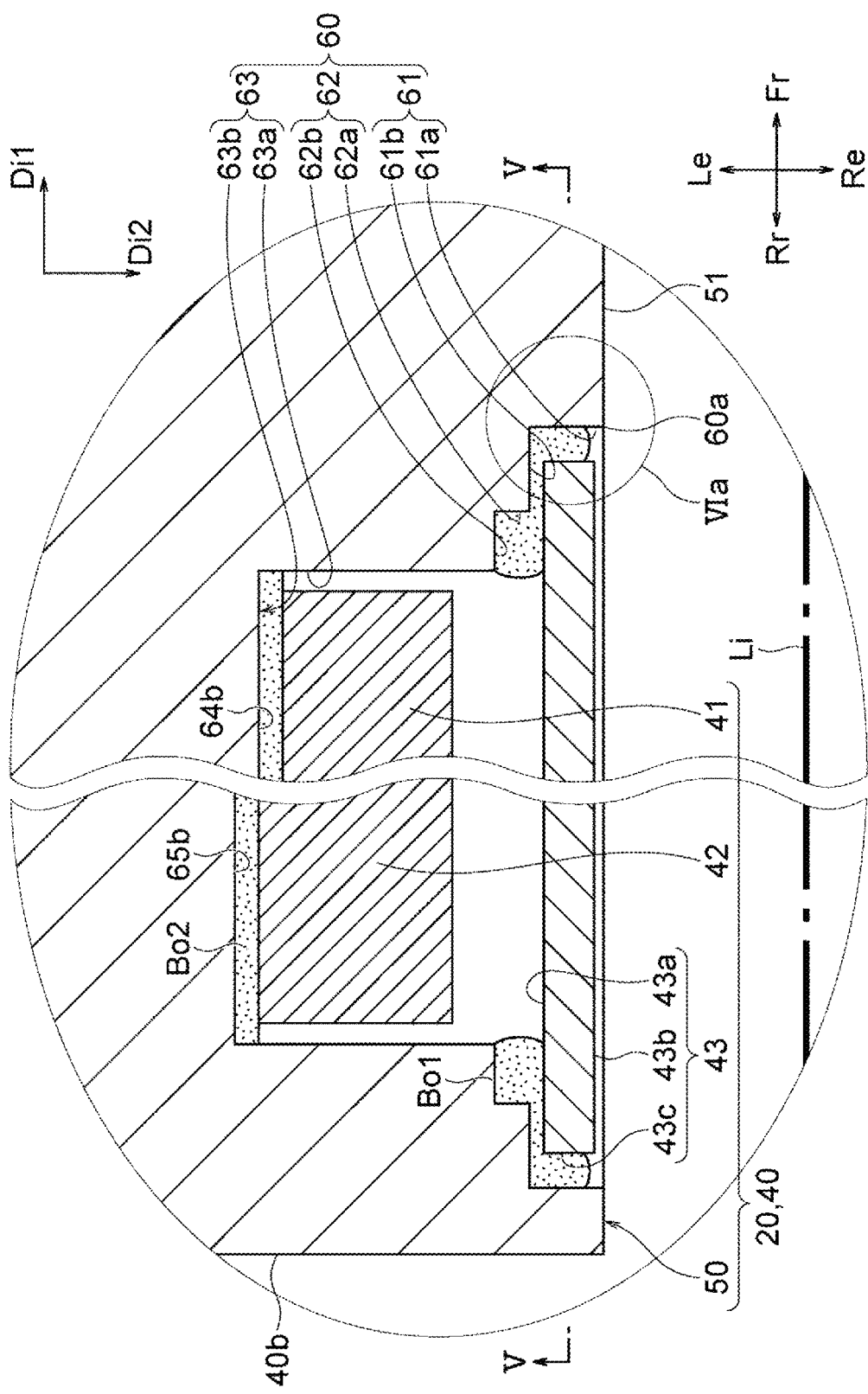

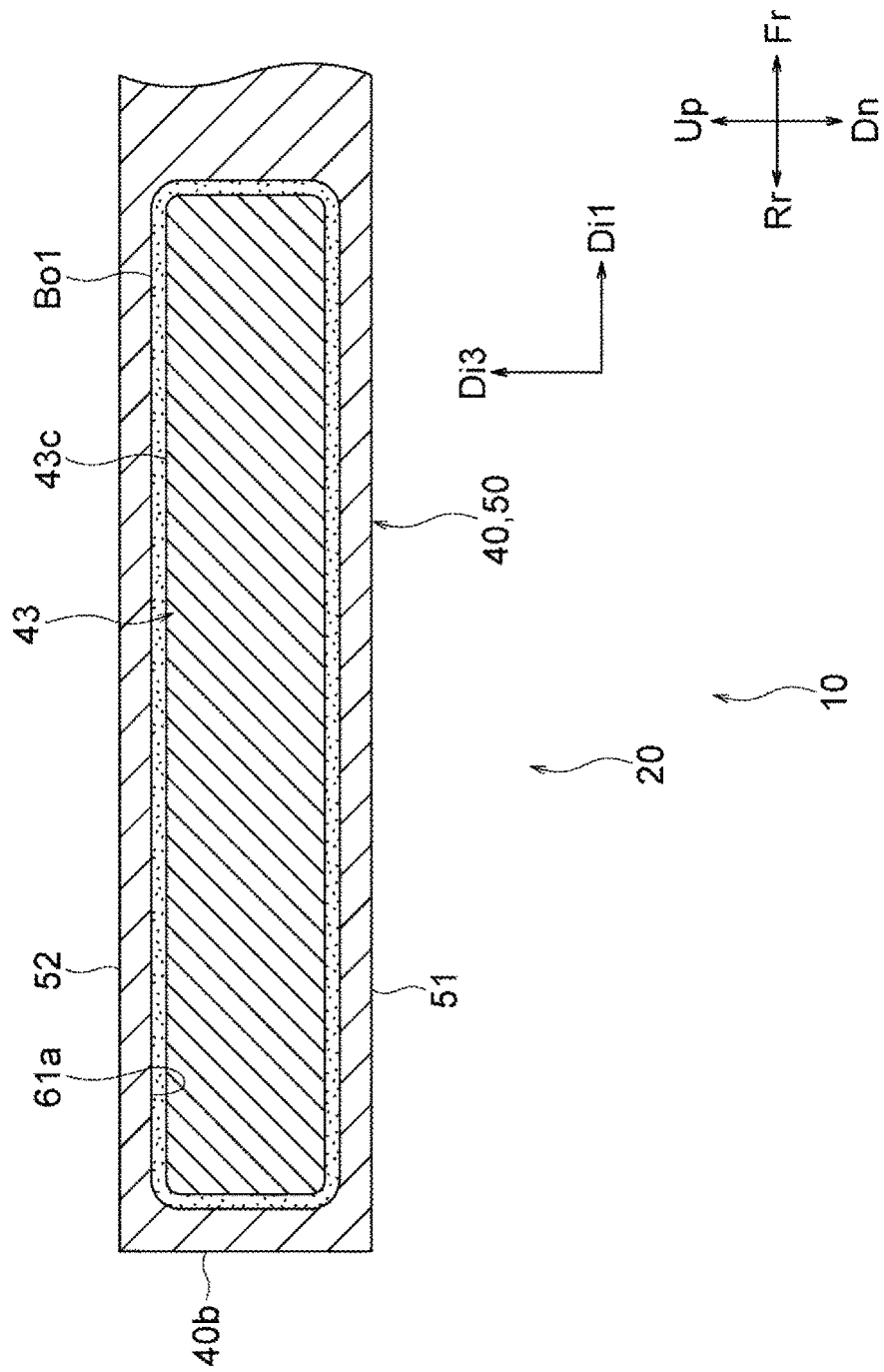

CUTTING TOOL, DATA COLLECTION SYSTEM, AND CUTTING TOOL HOLDER

RELATED APPLICATIONS

The present application is a National Phase of International Application No. PCT/JP2020/029793 filed Aug. 4, 2020, which claims priority to Japanese Application No. 2019-143677 filed Aug. 5, 2019.

TECHNICAL FIELD

The present disclosure may relate to a cutting tool, a data collection system including the cutting tool, and a cutting tool holder.

BACKGROUND ART

A known cutting tool (see PTL 1 for example) may be mounted on a machine tool to machine an object (wood or metal) by chipping off part of the object. The cutting tool of PTL 1 may have a holder, a tip detachably attached to the holder, and a sensor disposed at the tip.

CITATION LIST

Patent Literature

PTL 1: Japanese Unexamined Patent Application Publication No. 2012-20359

SUMMARY OF INVENTION

According to an aspect of the present disclosure, a cutting tool may include a base body, a tip, a sensor, and a cover. The base body may have a shank portion extending in a first direction, a fixation portion positioned at one end of the shank portion, and a recess opening at an outside surface of the shank portion. The tip may be fixed to the fixation portion and may have a cutting edge. The sensor may be positioned inside the recess. The cover may close the recess. Among peripheral surfaces of the shank portion, a first area may face one side in a second direction that is a direction orthogonal to the first direction, and the cutting edge may be positioned further toward the one side in the second direction from the first area. The entirety of the cover may be positioned further toward the other side in the second direction from the cutting edge.

According to another aspect of the present disclosure, a data collection system may include the cutting tool described above and a storage unit that stores data of physical quantity measured by the sensor.

According to another aspect of the present disclosure, a cutting tool holder may include a base body, a sensor, and a cover. The base body may have a shank portion extending in a first direction, a fixation portion positioned at one end of the shank portion, and a recess opening at an outside surface of the shank portion. The sensor may be positioned inside the recess. The cover may close the recess. Among peripheral surfaces of the shank portion, a first area may face one side in a second direction that is a direction orthogonal to the first direction, and the fixation portion may have a projection end that is positioned further toward the one side in the second direction from the first area. The entirety of the cover may be positioned further toward the other side in the second direction from the projection end.

BRIEF DESCRIPTION OF DRAWINGS

FIG. 4 is an enlarged view of a region IV in FIG. 3.

FIG. 5 is a cross section taken along line V-V in FIG. 4.

DESCRIPTION OF EMBODIMENTS

Figure 1:
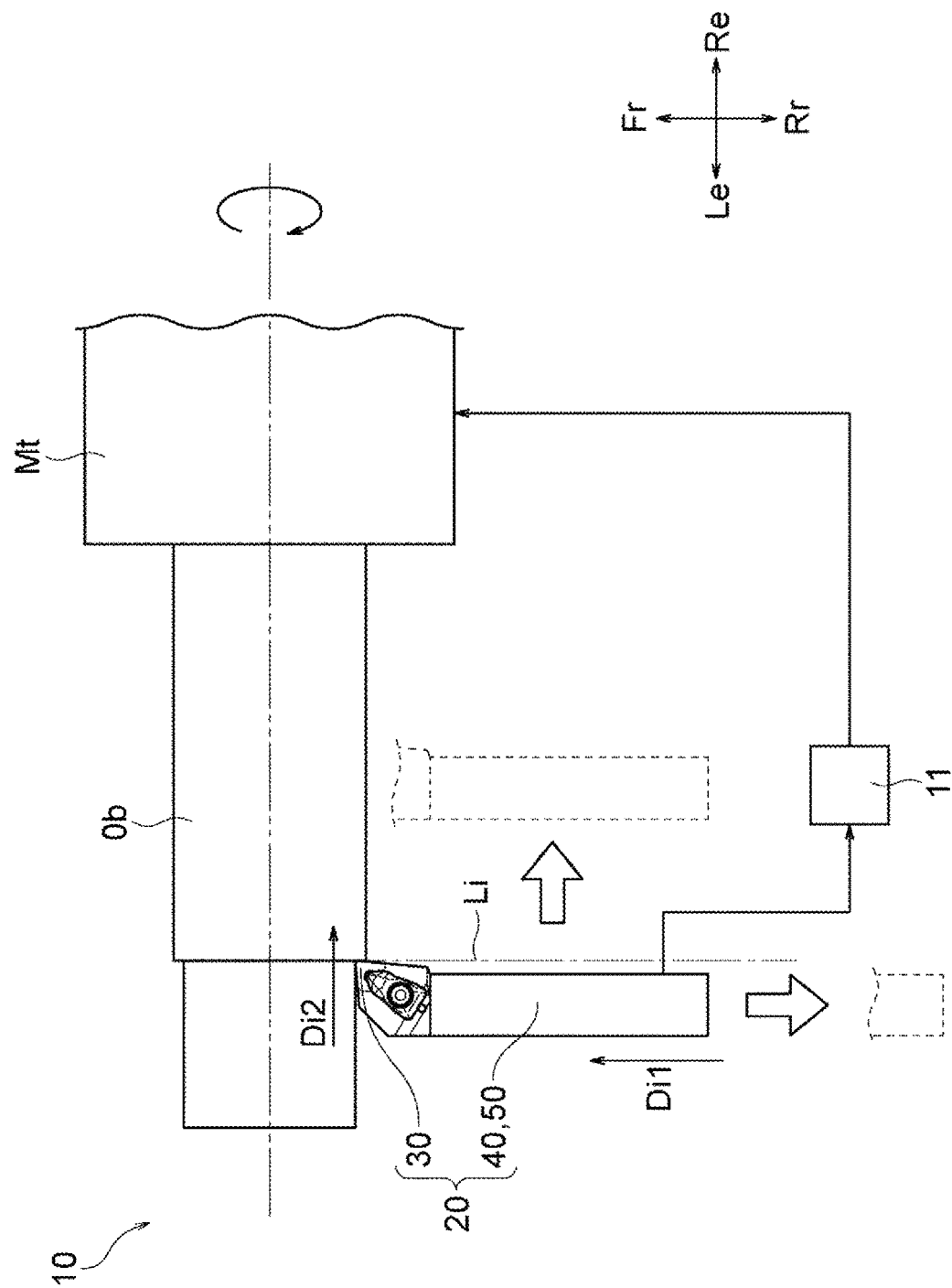
FIG. 1 is a schematic diagram illustrating an overview of a data collection system according to an embodiment.

An embodiment of the present disclosure will be described with reference to the drawings. In the description, "front" and "rear" may be terms for describing position along a cutting tool in the longitudinal direction thereof. For convenience, a side of the cutting tool on which a tip is present may be termed as a "front side", whereas a side of the cutting tool opposite to the front side may be termed as a "rear side". "Right" and "left" may be terms for describing position when the rear end of the cutting tool is viewed. Similarly to "right" and "left", "Up" and "down" may be terms for describing position when the rear end of the cutting tool is viewed. The terms "Up" and "Down" may be used to describe position in a direction orthogonal to the right-left direction. In the drawings, "Fr" may denote "front", "Rr" may denote "rear", "Le" may denote "left", "Ri" may denote "right", "Up" may denote "up", and "Dn" may denote "down". The drawings herein referred to may be schematic illustrations in which details may be omitted.

The terms "front-rear", "right-left", and "up-down" may be used in relation to directions in the present disclosure. These terms may be used only for the convenience of description of the present disclosure in relation to the drawings and are not intended to limit the present disclosure. For example, the use of the term "distal end" is not necessarily limited to indicate a front end (a frontward end), and the use of the term "rear end" is not necessarily limited to indicate a rearward end. In other words, the distal end can be interpreted as one end (one of the ends), and the rear end can be interpreted as the other end (the other one of the ends). The same may apply to terms related to "up-down direction" or to "right-left direction" or the like.

In addition, the terms "first direction", "second direction", and "third direction" may be used from time to time in the present disclosure. A first direction Di1 may be a direction extending from a rear side toward a front side, in other words, a direction (front-rear direction) extending from the rear end of the cutting tool toward the front end thereof. A second direction Di2 may be a direction extending from a left side toward a right side, in other words, a width direction (right-left direction) of the cutting tool. A third direction Di3 may be a direction extending from a lower side toward an upper side, in other words, a height direction (up-down direction) of the cutting tool.

Embodiment (Data Collection System)

As illustrated by way of example in FIG. 1, a data collection system 10 may include a cutting tool 20 (for example, a turning tool) and a data collection device 11. The cutting tool 20 may be configured to transmit data to an external device. The data collection device 11 may be configured to collect the data transmitted from the cutting tool 20. In the following description, the cutting tool 20 will be focused on first and then the data collection device 11.

(Cutting Tool)

The cutting tool 20 may be detachably mounted on a machine tool Mt. The cutting tool 20 may be movable in the front-rear, right-left, and up-down directions when the machine tool Mt is operated, for example, manually or under automatic control. When the machine tool Mt is operated (including the case of automatic control), the machine tool Mt may press the cutting tool 20 against a turning object Ob (a piece of wood, metal, etc.) to cut (machine) the object Ob so as to obtain a desired shape and size.

Examples of the cutting tool 20 may include an external turning tool for cutting the object Ob so as to obtain a specific outside diameter, an internal turning tool for cutting the object Ob so as to obtain a specific inside diameter, a grooving tool for cutting the object Ob so as to have a groove, as well as a threading tool and a cut-off tool. The cutting tool 20 may be also referred to as a single point tool.

Figure 2:
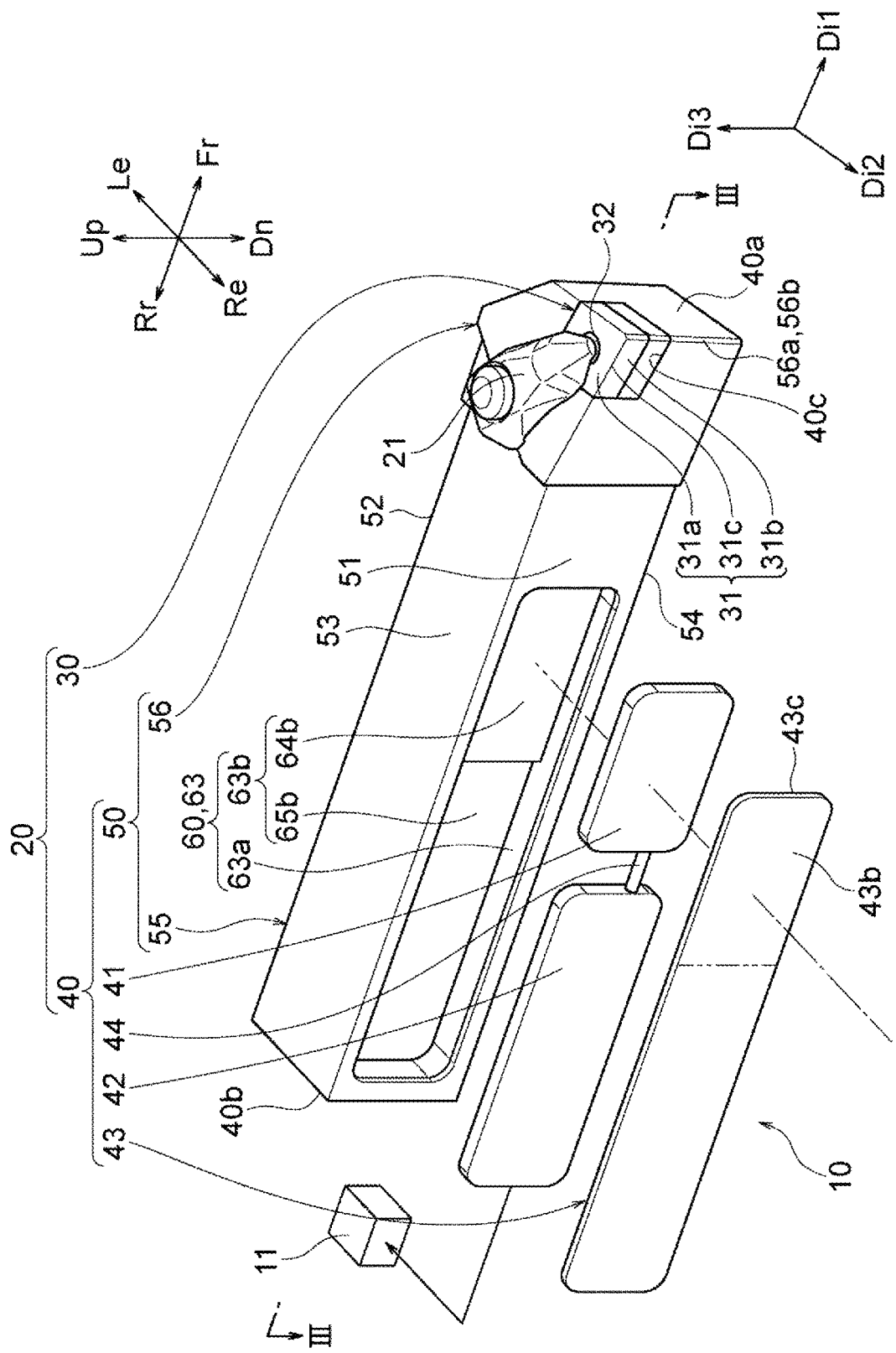
FIG. 2 is an exploded perspective view of a cutting tool illustrated in FIG. 1.

As illustrated in FIG. 2, the cutting tool 20 may include a holder 40, a tip 30, and a clamp 21. The holder 40 may be mountable onto the machine tool Mt (see FIG. 1). The tip 30 may be fixed to the holder 40 near a distal end 40a (hereinafter referred to as a "first end 40a") of the holder 40. The tip 30 may be configured to cut the object Ob (see FIG. 1). The clamp 21 may be configured to fix the tip 30 to the holder 40.

(Tip and Structure Around Tip)

The tip 30 may be an indexable insert or otherwise referred to as a throw away tip (hereinafter referred to as "insert 30"). The tip 30 may be positioned in a cavity 40c in the holder 40 and thereby fixed to the holder 40. The cavity 40c may be formed by removing a portion from the holder 40 at a position near the distal end 40a (hereinafter referred to as the "first end 40a") of the holder 40. The tip 30 may be shaped as desired. For example, the shape of the tip 30 may be determined in accordance with, for example, the material and/or shape of the object Ob. The tip 30 may be shaped like a quadrangular plate (see the illustrated example), a polygonal plate other than the quadrangular plate (for example, a triangular or pentagonal plate), or a disk-like plate.

The size of the tip 30 may be selected as desired. The height of the tip 30 (length in the up-down direction) may be, for example, 5 mm or more, or may be 20 mm or less. The width of the tip 30 (length in the right-left direction) may be, for example, 10 mm or more, or may be 20 mm or less. The size of the tip 30 may be determined in accordance with various conditions, such as the material of the object Ob.

The material of the tip 30 may be selected as desired. The material of the tip 30 may be, for example, cemented carbide or cermet. The composition of the cemented carbide may be, for example, WC—Co, WC—TiC—Co, and WC—TiC—TaC—Co. WC, TiC, and TaC may be in the form of hard particles. Co may be in the binder phase. The cermet may be a sintered composite material made by combining a metal and ceramic components. An example of the cermet may be a titanium compound of which TiC and/or TiN is a main ingredient.

The surface of the tip 30 may be coated using chemical vapor deposition or physical vapor deposition (or need not be coated). The composition of the coating may be, for example, TiC, TiN, TiCN, and $Al_2O_3$.

The tip 30 may have a cutting portion 31 as at least part of the tip 30. The cutting portion 31 may be configured to cut the object Ob. The cutting portion 31 may be partially present outside the first end 40a of the holder 40. Put another way, the cutting portion 31 may protrude from the holder 40 of the cutting tool 20.

(Cutting Portion)

The cutting portion 31 may have a rake face 31a, a flank face 31b, and a cutting edge 31c. The rake face 31a may be formed as the upper surface of the cutting portion 31. The flank face 31b may intersect the rake face 31a and be formed as a side surface of the cutting portion 31. The cutting edge 31c may be positioned at the border between the rake face 31a and the flank face 31b.

The rake face 31a may be a portion over which chips pass when the object Ob is cut. The rake face 31a may face in the third direction Di3. Here, "to face in the third direction Di3" does not necessarily mean that the rake face 31a orthogonally intersects the third direction Di3. For example, as viewed in the first direction Di1, the rake face 31a may incline (or need not incline) at a predetermined rake angle with respect to the second direction Di2. The term "to face" may have the same connotation when it is used to describe other surfaces.

Figure 3:
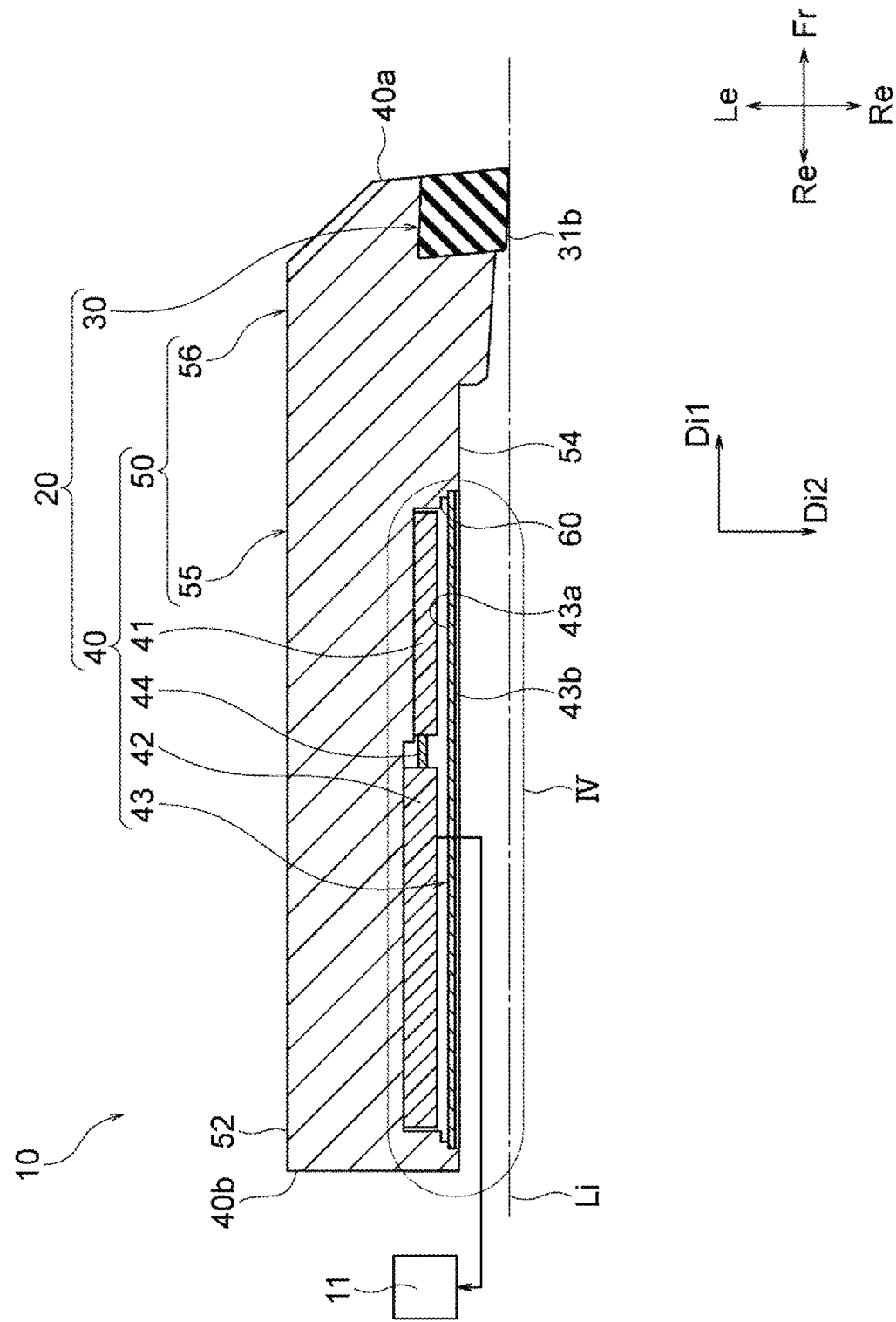
FIG. 3 is a cross section taken along line III-III in FIG. 2.

The flank face 31b may incline at a predetermined angle with respect to the third direction Di3. Accordingly, the tip 30 may not readily come into unnecessary contact with the object Ob during cutting. The flank face 31b may face one side in the second direction Di2 (the right side in the right-left direction, in other words, a side that a first side surface 51 faces, which will be described later). Here, the third direction Di3 may be a direction that orthogonally intersects the second direction Di2 as viewed in the first direction Di1. The flank face 31b may intersects the rake face 31a with the cutting edge 31c interposed therebetween. The flank face 31b may be present at least partially outside the holder 40. For example, as illustrated in FIG. 3, at least part of the flank face 31b may be present rightward of the holder 40 (toward one side in the second direction Di2).

The cutting edge 31c may be positioned at a ridgeline, in other words, at the border between the rake face 31a and the flank face 31b. When the object Ob is cut, the cutting edge 31c may cut into the object Ob and thereby directly contributes to the cutting. The cutting edge 31c may be positioned further toward one side in the second direction Di2 from the position of one of the peripheral surfaces (i.e., a first side surface 51, which will be described later) of the holder 40 (i.e., a shank portion 55, which will be described later), the one of the peripheral surfaces facing the one side in the second direction Di2, which is a direction orthogonal to the first direction Di1. The cutting edge 31c may have a curved surface (or need not have a curved surface).

The rake face 31a may have a groove and/or a protrusion (or need not have these). For example, when the rake face 31a has a groove and/or a protrusion, chips produced from the object Ob may be separated easily at a predetermined length. This may suppress chips of the object Ob from becoming excessively long. As a result, the chips do not twine easily around the cutting tool 20 or the object Ob.

The tip 30 may have a through hole 32 that pierces the tip 30 in the up-down direction (or need not have it). A portion of the clamp 21 may be inserted in the through hole 32. The tip 30 may be held by the cavity 40c (the bottom of the cavity 40c) and the clamp 21 inserted in the through hole 32 and thereby fixed to the holder 40. The clamp 21 may be fixed to the holder 40 with a screw screwed into the holder 40.

(Holder)

For example, the holder 40 may be shaped like a bar and may have a length between the distal end 40a (the first end 40a) and a rear end 40b (otherwise referred to as a "second end 40b"). Put another way, the holder 40 may extend in the first direction Di1 and may have a certain length. The length of the holder 40 (the length from the first end 40a to the second end 40b) may be determined as desired. For example, the holder 40 may have a length of 50 mm or more and 200 mm or less.

The shape of the holder 40 may be determined as desired. For example, the holder 40 may have a rectangular transverse section (a cross section perpendicular to the front-rear direction). In some embodiments, the holder 40 may have a transverse section shaped like a trapezoid or a circle. The width of the holder 40 (length in the right-left direction) and the height of the holder 40 (length in the up-down direction) may be, for example, 10 mm or more, 19 mm or more, 25 mm or more, or 50 mm or more. The width and the height of the holder 40 may be different from each other or may be the same. The height of the holder 40 may be constant in the front-rear direction or may become greater toward the distal end 40a.

For example, the holder 40 may include a base body 50, a sensor 41, a wireless communication unit 42, a cover 43, and wiring 44. The base body 50 may be a base portion of the holder 40 and may occupy a major part of the holder 40. The sensor 41 may be positioned inside the base body 50. The wireless communication unit 42 may be positioned inside the base body 50 and connected to the sensor 41. The cover 43 may cover the sensor 41 and the wireless communication unit 42 and be fixed to the base body 50. The wiring 44 electrically may connect the sensor 41 and the wireless communication unit 42 to each other. The wiring 44 may be also covered by the cover 43. The sensor 41 in the base body 50 can measure physical quantities that indicate the conditions of the cutting tool 20 (for example, temperature or the like of the cutting tool 20). Details about the physical quantities to be measured by the sensor 41 will be described later. The physical quantities measured by the sensor 41 may be sent to the wireless communication unit 42 via wiring 44. The wireless communication unit 42 may be configured to transmit data including the physical quantities to an external device (for example, the data collection device 11).

(Base Body)

For example, the base body 50 may be a remaining portion of the holder 40 after the sensor 41, the wireless communication unit 42, the wiring 44, and the cover 43 are removed. The material of the base body 50 may be selected as desired. For example, the material of the base body 50 may be steel or cast iron. Cast iron may be adopted in order to increase elastic toughness of the base body 50. The size and shape of the base body 50 may be substantially similar to those of the holder 40, and duplicated descriptions may be omitted here. The first end 40a may be the distal end (frontward end) of the base body 50, and the second end 40b may be the rear end (rearward end) of the base body 50.

The base body 50 may have a first side surface 51 (which is an example of a "first area"), a second side surface 52, a third side surface 53, and a fourth side surface 54. The first side surface 51 may connect the first end 40a and the second end 40b and may face the same side that the flank face 31b of the tip 30 faces. The second side surface 52 may be positioned opposite to the first side surface 51. The third side surface 53 may connect the first side surface 51 and the second side surface 52 and may face the same side that the rake face 31a of the tip 30 faces. The fourth side surface 54 may be positioned opposite to the third side surface 53. For example, the base body 50 may have a shank portion 55, a fixation portion 56, and a recess 60. The shank portion 55 may include the second end 40b and be fixed to the machine tool Mt. The fixation portion 56 may continue to the distal end (frontward end) of the shank portion 55 and may be a portion of the base body 50 near the first end 40a. The tip 30 may be fixed to the fixation portion 56. The recess 60 may open at an outer surface of the shank portion 55. The shank portion 55 may extend in the first direction Di1. The shank portion 55 and the fixation portion 56 may continue to each other and may be formed integrally.

The first side surface 51 may be the right side surface of the base body 50. The first side surface 51 may face the same side that the flank face 31b faces. Here, the first side surface 51 need not face in exactly the same direction in which the flank face 31b faces. The first side surface 51 may be one of the surfaces of the base body 50 that faces most closely toward the side that the flank face 31b faces.

The second side surface 52 may connect the first end 40a and the second end 40b and may be the left side surface of the base body 50. The third side surface 53 may connect the first side surface 51 and the second side surface 52 and may be the upper surface of the base body 50. The third side surface 53 may face the same side that the rake face 31a faces. Here, the third side surface 53 need not face in exactly the same direction in which the rake face 31a faces. The third side surface 53 may be one of the surfaces of the base body 50 that faces most closely toward the side that the rake face 31a faces. The fourth side surface 54 may connect the first side surface 51 and the second side surface and may be the lower surface of the base body 50. The fourth side surface 54 may be positioned opposite to the third side surface 53.

(Fixation Portion)

The fixation portion 56 may have a projection 56a (or need not have it). The projection 56a may protrude outward from a side surface (first side surface 51) of the base body 50. The fixation portion 56 (projection 56a) may have a projection end 56b. Here, a direction orthogonal to the first direction Di1 may be the second direction Di2. Among peripheral surfaces of the shank portion 55, the projection end 56b may be positioned (or need not be positioned) further toward one side in the second direction Di2 from the first side surface 51 that faces the one side in the second direction Di2. The projection end 56b may be the vertex of the projection 56a.

As described above, the base body 50 (holder 40) may have the cavity 40c near the first end 40a, and the insert 30 may be mounted in the cavity 40c. For example, the cavity 40c may be formed in an upper portion of the projection 56a. Put another way, the cavity 40c may be formed by removing at least a portion from the projection 56a (base body 50). The clamp 21 for fixing the tip 30 may abut the fixation portion 56 and be fixed to the fixation portion 56 in this state.

(Recess and Structure Around Recess)

Refer to FIG. 2 and FIG. 3. For example, the recess 60 may open at the first side surface 51 and be recessed with a certain depth toward the second side surface 52. For example, the sensor 41 and the wireless communication unit 42 may be positioned in the recess 60. The recess 60 and the cover 43 may surround the sensor 41 and the wireless communication unit 42. The wiring 44 for electrically connecting the sensor 41 and the wireless communication unit 42 may also be positioned in the recess 60.

The shape of the recess 60 may be determined appropriately, for example, in accordance with the shapes of the sensor 41 and the wireless communication unit 42. The recess 60 may have (or need not have) a region that has a smaller inside dimensions and is located near the bottom 63b (the bottom here is denoted by a reference sign 63b for convenience, which is the reference sign to be used for a third bottom (see later description)). In other words, the region may have a smaller length between opposing sides at least in one of the directions of crossing the region. As viewed sideways, the recess 60 may be shaped, for example, like a rectangle (see the illustrated example), an ellipse, a circle, or a trapezoid. The ratio of the depth of the recess 60 to the thickness of the shank portion 55 may be, for example, one tenth or more, one fifth or more, one third or more, or one half or more.

The size of the recess 60 (lengths in the up-down and front-rear directions) may be determined appropriately, for example, in accordance with the sizes of the sensor 41 and the wireless communication unit 42. The width of the recess 60 (length in the front-rear direction) may be set to be larger than a total of the widths of the sensor 41 and of the wireless communication unit 42. The width of the recess 60, however, may be set to be equal to or smaller than the total width depending on an arrangement of the sensor 41 and the wireless communication unit 42. For example, the ratio of the width of the recess 60 to the length of the holder 40 in the front-rear direction may be four fifths or less, three fifths or less, two fifths or less, or one fifth or less. The ratio of the height of the recess 60 (length in the up-down direction) to the length of the holder 40 in the up-down direction may be, for example, nine tenths or more, seven tenths or more, or one half or more.

Refer to FIG. 4 and FIG. 5. In the right-left direction, a region inside the recess 60 stretching from the bottom 63b to the cover 43 (a region surrounded by surfaces inside the recess 60 and the cover 43) may be sealed. In other words, the cover 43 may seal at least part of the recess 60 that opens at the first side surface 51 by covering the part of the recess 60 from the first side surface 51. The cover 43, however, may cover the opening of the recess 60 without sealing the recess 60.

Put another way, the region surrounded by the surfaces inside the recess 60 and the cover 43 may be an enclosed space. The enclosed space may be a vacuum or filled with an inert gas or air. The enclosed space may be sealed to such a degree that, for example, chips generated and oil or the like used during cutting are suppressed from entering the enclosed space easily. The degree of sealing of the recess 60 may be determined appropriately in accordance with the use of cutting tool 20. In the case of only suppressing relatively large chips from entering the recess 60 easily, the cover 43 may have a small through hole with a diameter smaller than a chip.

As illustrated by way of example in FIG. 4, the region inside the recess 60 may be a void. This can reduce the weight of the cutting tool 20. Alternatively, the recess 60 may be filled with a resin material, such as acrylic resin. Filling the recess 60 with a resin material can improve the sealing of components inside the recess 60.

For example, the recess 60 may have a first recess 61, a second recess 62, and a third recess 63. The first recess 61 may be recessed toward the second side surface 52 (see FIG. 2) and may have an opening 60a at the first side surface 51. The second recess 62 may be recessed toward the second side surface 52 and may open at a first bottom 61b of the first recess 61. The third recess 63 may be recessed toward the second side surface 52 and may open at a second bottom 62b of the second recess 62. In other words, the recess 60 may be shaped so as to have the first to third recesses 61, 62, and 63 arranged in this order from the first side surface 51 toward the second side surface 52 (or from the first side surface 51 to the bottom 63b of the recess 60). The recess 60 need not have two-or-more-tier recesses.

The recess 60 may have a first intermediate position between the first side surface 51 and the bottom 63b of the recess 60 in the depth direction (the first intermediate position is the same position as that of the first bottom 61b and may be referred to as a "first intermediate position 61b" using the reference sign 61b for the first bottom). For example, a region of the recess 60 stretching from the first side surface 51 to the first intermediate position 61b in the depth direction may be enlarged beyond opposite sides at least in one of the directions of crossing the region compared with a region of the recess 60 stretching from the first intermediate position 61b toward the bottom 63b of the recess 60. The first recess 61 may be this enlarged region stretching from the first side surface 51 to the first intermediate position 61b. In addition, the recess 60 may have a second intermediate position between the first intermediate position 61b and the bottom 63b of the recess 60 in the depth direction (the second intermediate position is the same position as that of the second bottom 62b and may be referred to as a "second intermediate position 62b" using the reference sign 62b for the second bottom). For example, a region of the recess 60 stretching from the first intermediate position 61b to the second intermediate position 62b in the depth direction may be enlarged beyond opposite sides in at least one of the directions of crossing the region compared with a region of the recess 60 stretching from the second intermediate position 62b toward the bottom 63b of the recess 60. The second recess 62 may be this enlarged region stretching from the first intermediate position 61b to the second intermediate position 62b. The first intermediate position 61b and the second intermediate position 62b may be set as desired, which will be described later.

For example, the cover 43 may be positioned inside the first recess 61. The sensor 41 and the wireless communication unit 42 may be positioned, for example, inside the third recess 63. For example, the first recess 61 may contribute to the positioning of the cover 43 when the cover 43 is bonded to the base body 50. For example, when the cover 43 is bonded (adhered) to the base body 50 using a bonding member Bo1 (otherwise referred to as a first bonding member Bo1), the second recess 62 may contribute to the suppression of the first bonding member Bo1 from entering the third recess 63 easily. The third recess 63 may contribute to the forming of the space in which the sensor 41 and the wireless communication unit 42 are positioned.

For example, the first bonding member Bo1 described above may be an adhesive made of an organic material or an inorganic material. The first bonding member Bo1 may be, or need not be, electrically conductive.

Refer to FIG. 2 together with FIG. 4. In the up-down and front-rear directions, the lengths (heights and widths) of the first recess 61, the second recess 62, and the third recess 63 may be set as desired. For example, the lengths of the first recess 61, the second recess 62, and the third recess 63 in the up-down and front-rear directions may become gradually smaller in the order from the first recess 61 to the third recess 63. In some embodiments, the lengths of the first recess 61, the second recess 62, and the third recess 63 in the front-rear direction may become gradually smaller in this order, whereas the lengths of these recesses remain the same in the up-down direction. In some embodiments, the lengths of the first recess 61, the second recess 62, and the third recess 63 in the up-down direction may become gradually smaller in this order, whereas the lengths of these recesses remain the same in the front-rear direction. As viewed sideways, the first recess 61 may be larger than the cover 43, and the second recess 62 may be smaller than the cover 43.

The first recess 61 may have a first interior wall 61a (otherwise referred to as an inner peripheral surface 61a) and the first bottom 61b. The first interior wall 61a may extend from the opening 60a of the recess 60 toward the second side surface 52. The first bottom 61b may be connected to the first interior wall 61a and be the bottom of the first recess 61.

The second recess 62 may have a second interior wall 62a and the second bottom 62b. The second interior wall 62a may extend from the first bottom 61b toward the second side surface 52. The second bottom 62b may be connected to the second interior wall 62a and may be the bottom of the second recess 62.

The third recess 63 may have a third interior wall 63a and a third bottom 63b. The third interior wall 63a may extend from the second bottom 62b toward the second side surface 52. The third bottom 63b may be connected to the third interior wall 63a and may be the bottom of the third recess 63.

Refer to FIG. 4 and FIG. 5. For example, the first interior wall 61a may define the opening 60a of the recess 60 and may be present along the periphery of the opening 60a. For example, the height of the first interior wall 61a (length in the depth direction of the recess 60) may be greater than the thickness of the cover 43. In other words, the depth of the first recess 61 may be greater than the thickness of the cover 43. The depth of the first recess 61, however, may be equal to or smaller than the thickness of the cover 43 as opposed to the illustrated example. For example, the first interior wall 61a may entirely surround a side surface 43c (hereinafter referred to as a side portion 43c) of the cover 43. Put another way, the cover 43 may be entirely present inside the first recess 61 (recess 60).

Figure 6A:
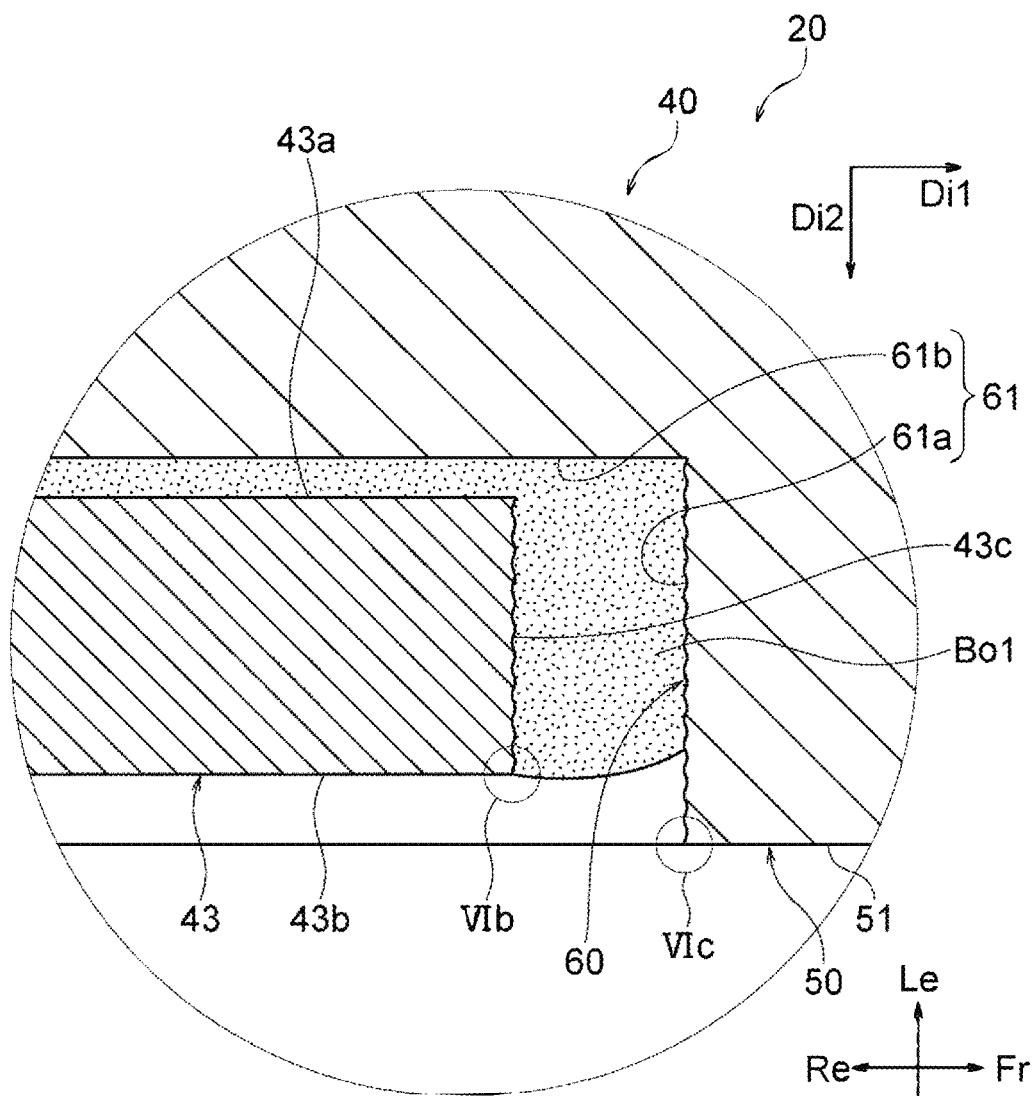
FIG. 6A is an enlarged view of a region VIa in FIG. 4.
Figure 6B:
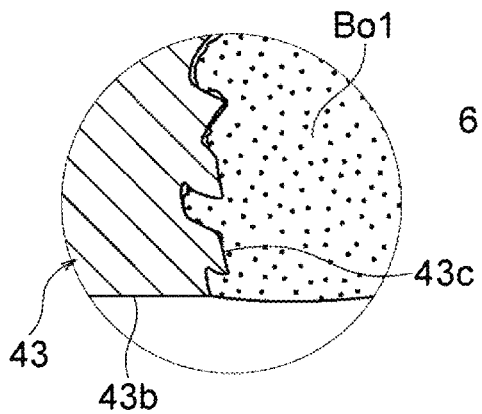
FIG. 6B is an enlarged view of a region VIb in FIG. 6A.
Figure 6C:
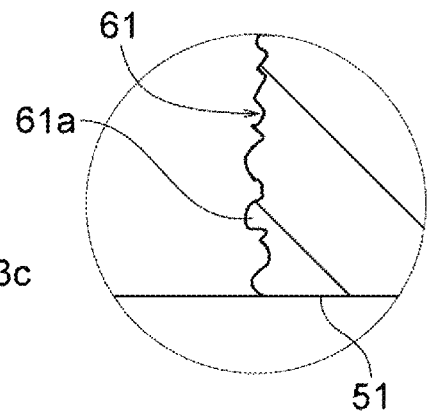
FIG. 6C is an enlarged view of a region VIc in FIG. 6A.

Refer to FIG. 6A and FIG. 6C. The surface of the first interior wall 61a (inner peripheral surface 61a of the first recess 61) may be rougher than the first side surface 51. More specifically, for example, the surface roughness of the first interior wall 61a may be set to be 1.5 times or more or 2 times or more as large as the surface roughness of the first side surface 51. In the case of the surface roughness of the first interior wall 61a being relatively large, when, for example, the cover 43 is fixed to the base body 50 using the first bonding member Bo1, the first bonding member Bo1 can be adhered more strongly to the first interior wall 61a. The surface roughness of the first interior wall 61a, however, may be the same as, or may be smaller than, the surface roughness of the first side surface 51. The surface roughness can be evaluated using arithmetic mean roughness Ra. The arithmetic mean roughness Ra may be measured, for example, in accordance with JIS B0601-2001. The surface roughness may be measured, for example, by a contact-type surface roughness tester using a probe or a non-contact-type surface roughness tester using a laser.

Refer to FIG. 4. The first bottom 61b may be positioned at the first intermediate position 61b in the recess 60. For example, the first bottom 61b may include a portion that opposes the surface of the cover 43 (the surface being referred to as an inside portion 43a) that faces the bottom 63b of the recess 60. For example, the ratio of the area of the first bottom 61b that opposes the inside portion 43a to the total area of the first bottom 61b may be 90% or more, 70% or more, or 50% or more. The surface roughness of the first bottom 61b may be determined as desired. For example, the surface roughness of the first bottom 61b may be larger than that of the first side surface 51. This enables the first bonding member Bo1 to be adhered more strongly to the first bottom 61b.

The height of the second interior wall 62a (length in the depth direction of the recess 60) may be determined as desired. For example, the height of the second interior wall 62a may be smaller than the thickness of the cover 43 (as in the illustrated example) or may be equal to or greater than the thickness of the cover 43. The second interior wall 62a may be, or need not be, formed perpendicularly to the first bottom 61b.

The second bottom 62b may be positioned at the second intermediate position 62b in the recess 60. The entire second bottom 62b may oppose the inside portion 43a of the cover 43. The surface roughness of the second bottom 62b may be larger than the surface roughness of the first side surface 51 (or need not be larger). This enables the first bonding member Bo1 to be adhered more strongly to the second bottom 62b. For example, the surface roughness of the second bottom 62b may be set to be 1.5 times or more or 2 times or more as large as the surface roughness of the first side surface 51. The surface roughness can be evaluated using arithmetic mean roughness Ra.

The holder 40 may have a gap (a space in which the first bonding member Bo1 is present) between the second bottom 62b and the inside portion 43a. In other words, the inside portion 43a may be positioned so as to be spaced from the second bottom 62b. The bonding member Bo1 may be present in the gap between the inside portion 43a and the second bottom 62b. For example, the size of the gap (length in the depth direction of the recess 60) may be set to be substantially the same as, or greater than, the depth from the first bottom 61b to the second bottom 62b. In the illustrated example, the size of the gap may be set to be the sum of the depth from the first bottom 61b to the second bottom 62b and the thickness of a portion of the first bonding member Bo1 interposed between the first bottom 61b and the cover 43. As opposed to the illustrated example, the cover 43 may have a portion to be inserted into part of the second recess 62. In this case, the size of the gap at only part of the second bottom 62b may be defined as described above. For example, the ratio of the size of the gap to the thickness of the cover 43 may be one, two thirds or less, one half or less, or one third or less.

Refer to FIG. 2 and FIG. 4. The height of the third interior wall 63a (length in the depth direction of the recess 60) may be set as desired. For example, the height of the third interior wall 63a may be greater than the thickness of the sensor 41 and the thickness of the wireless communication unit 42. For example, the third interior wall 63a may surround the entire side surfaces of the sensor 41 and the wireless communication unit 42. Put another way, the sensor 41 and the wireless communication unit 42 may be positioned inside the third recess 63.

For example, the height of the third interior wall 63a at a position at which the sensor 41 is disposed may be different from the height of the third interior wall 63a at a position at which the wireless communication unit 42 is disposed. More specifically, the height of the third interior wall 63a at the position of the wireless communication unit 42 may be greater than the height of the third interior wall 63a at the position of the sensor 41. The height of the third interior wall 63a may be determined in accordance with the thicknesses of the sensor 41 and the wireless communication unit 42. For example, the ratio of the height of the third interior wall 63a to the thickness of the sensor 41 may be 1 time or more, 1.5 times or more, 2 times or more, or 3 times or more.

The sensor 41 and the wireless communication unit 42 may be fixed to the recess 60 using an appropriate method. For example, the fixation may be carried out by way of bonding or using screws. In the case of bonding, the sensor 41 and the wireless communication unit 42 may be bonded, for example, to the third bottom 63b. The third bottom 63b may have a sensor bonding surface 64b and a wireless communication unit bonding surface 65b. The sensor 41 may be bonded to the sensor bonding surface 64b. The wireless communication unit 42 may be bonded to the wireless communication unit bonding surface 65b. The wireless communication unit bonding surface 65b may be positioned closer than the sensor bonding surface 64b to the second side surface 52. Put another way, the sensor bonding surface 64b may be positioned closer than the wireless communication unit bonding surface 65b to the first side surface 51. The sizes of the sensor bonding surface 64b and the wireless communication unit bonding surface 65b (i.e., lengths in the front-rear and up-down directions) may be determined appropriately in accordance with the sizes of the sensor 41 and the wireless communication unit 42.

(Cover)

The cover 43 may be, for example, a rectangular flat plate. The shape of the cover 43 may be determined appropriately in accordance with the shape of the recess 60. For example, as viewed sideways, if the recess 60 (the opening 60a of the recess 60) is shaped like an ellipse, the cover 43 may be a flat plate shaped like an ellipse. For example, in the up-down direction, the length of the cover 43 may be slightly smaller than the length of the first recess 61 and may be slightly greater than the length of the second recess 62. Moreover, in the front-rear direction, the length of the cover 43 may be slightly smaller than the length of the first recess 61 and may be slightly greater than the length of the second recess 62. This enables the cover 43 to be fitted in the first recess 61 to cover the sensor 41 and the wireless communication unit 42. In other words, the first recess 61 may serve to position the cover 43.

The cover 43 may have a portion protruding in a direction away from the base body 50. The protrusion of the cover 43 enables a user to hold the cover 43, for example, in the case of bonding the cover 43 to the base body 50. This may improve work efficiency in bonding the cover 43 to the base body 50. The entirety of the cover 43 may be positioned further inside the base body 50 (closer to the bottom 63b of the recess 60) relative to the position of the first side surface 51 (outside surface of the base body 50). Put another way, the cover 43 may be present entirely inside the recess 60 (first recess 61). In addition, in the case of the projection end 56b being positioned at one side in the second direction Di2, the entirety of the cover 43 may be positioned further toward the other side in the second direction Di2 (toward the left side in the right-left direction or the side that the second side surface 52 faces) from the position of the projection end 56b.

The material of the cover 43 may be selected as desired. For example, the cover 43 may be made of an organic material such as resin, an inorganic material such as glass, or a metal such as steel, cast iron, or stainless steel. The material of the cover 43 may be the same as, or may be different from, the material of the base body 50.

Here, a positional relationship between the cover 43 and the tip 30 will be described. Let "Li" may denote a straight line that passes through any point of the cutting edge 31c (the rake face 31a and the flank face 31b) and extends in the front-rear direction along the first side surface 51 (see FIG. 3). In the example of FIG. 2, the cover 43 may be positioned closer than the straight line Li to the bottom 63b of the recess 60 (to the second side surface 52). The cover 43 may be positioned further toward the base body 50 from the straight line Li that passes through the vertex of the projection 56a and extends along the side surface (first side surface 51). Put another way, the entirety of the cover 43 may be positioned further toward the other side in the second direction Dig from the cutting edge 31c. As illustrated in FIG. 4, for example, at least a portion of the cover 43 near the inside surface thereof may be accommodated in the first recess 61. The inner peripheral surface 61a of the first recess 61 (first interior wall 61a) and the first bottom 61b may serve to position the cover 43.

Refer to FIG. 4 and FIG. 5. For example, the cover 43 may be bonded to the base body 50 using the first bonding member Bo1. For example, the first bonding member Bo1 may be present (interposed) along the entire periphery of the opening 60a of the recess 60 between surfaces inside the recess 60 (surfaces from the first interior wall 61a to the second bottom 62b) and the cover 43 (surfaces of the side portion 43c and part of the inside portion 43a). Thus, the cover 43 may be bonded to the base body 50 along the periphery of the opening 60a of the recess 60. Here, for example, the first bonding member Bo1 may have at least a portion being in contact with the inside surface of the cover 43 (inside portion 43a) and may also have at least a portion being in contact with the side surface of the cover 43 (side portion 43c). The side portion 43c and the inside portion 43a may be thus bonded to the interior wall of the recess 60.

In the bonding of the cover 43, only the side portion 43c of the cover 43 may be bonded to the interior wall of the recess 60 (first interior wall 61a) or only the inside portion 43a of the cover 43 may be bonded to the interior wall of the recess 60 (the first bottom 61b and/or the second bottom 62b). The first bonding member Bo1 may be present inside the second recess 62 (as in the illustrated example) or need not be present inside the second recess 62. For example, the first bonding member Bo1 may be present entirely inside the recess 60. Put another way, the entire first bonding member Bo1 may be positioned further toward the inside surface of the cover 43 (inside portion 43a) from the outside surface of the cover 43.

The cover 43 may be bonded to the base body 50 using the first bonding member Bo1 or, for example, bonded directly using a method such as welding. Alternatively, the cover 43 may be fixed to the base body 50 using screws with a packing interposed between the cover 43 and the recess 60. When the cover 43 is screwed to the recess 60 with the packing interposed therebetween, a region surrounded by the cover 43 and the recess 60 can be regarded as an enclosed space.

Refer to FIG. 6A and FIG. 6B. For example, the surface roughness of the side portion 43c may be larger than that of the inside portion 43a. For example, this enables the first bonding member Bo1 to be bonded strongly to the side portion 43c. For example, the surface roughness of the side portion 43c may be larger than the surface roughness of a surface of the cover 43 that faces outward form the base body 50 (otherwise referred to as an outside portion 43*b*). The surface roughness of the inside portion 43*a* may be larger, or may be smaller, than the surface roughness of the outside portion 43*b*.

(Sensor and Wireless Communication Unit)

Refer to FIG. 2. The sensor 41 may be, for example, a device configured to measure the condition of the cutting tool 20 during cutting. The wireless communication unit 42 may be, for example, a device configured to transmit the data containing physical quantities measured by the sensor 41 to an external device (for example, to the data collection device 11). The data containing the physical quantities measured by the sensor 41 may be sent to the wireless communication unit 42 via the wiring 44 and transmitted to the data collection device 11 from the wireless communication unit 42.

Here, examples that can be measured by the sensor 41 in relation to the condition of the cutting tool 20 during cutting may include physical quantities, such as temperature, acceleration, vibration, strain, internal stress, as well as physical quantities related to wear or the like of the cutting tool 20. Here, "to measure the condition" may mean measuring of at least one of the above physical quantities of the cutting tool. The measurement is not only directed to physical quantities in a static state in which the condition does not change considerably but also directed to physical quantities in a dynamic state in which the condition changes. The static state and the dynamic state may be described in detail as follows.

For example, the physical quantity measured by the sensor 41 may be assumed to be the temperature of the cutting tool 20 (base body 50), and the temperature of the base body 50 may be assumed to rise from 20° C. before cutting to 80° C. during cutting of the object Ob (see FIG. 1). Here, the physical quantity in the static state may be the temperature of 20° C. of the base body 50 before cutting, whereas the physical quantity in the dynamic state is the amount of change in temperature of the base body 50 from 20° C. to 80° C. due to the cutting. For example, the sensor 41 may be configured to measure these static and dynamic physical quantities. The data obtained from the sensor measurement related to the cutting tool 20 is not limited to the above-described temperature, acceleration, vibration, internal stress, and wear.

In an embodiment, the sensor 41 may have a thermocouple. In this case, the sensor 41 can measure a physical quantity, for example, related to gas temperature. In an embodiment, for example, the sensor 41 may have a piezoelectric sensor including piezoelectric elements. In this case, the sensor 41 can measure physical quantities related to, for example, acceleration, vibration, strain, and internal stress of the base body 50. For example, the sensor 41 of the present disclosure may be simply a wiring circuit. In the case of the sensor 41 simply being a wiring circuit, the sensor 41 can measure, for example, the wear of the cutting tool 20. More specifically, the sensor 41 may measure the resistance of the wiring circuit (sensor 41) that varies in response to the degree of wear, thereby providing the data related to the condition of the cutting tool 20. Various types of sensors can be adopted as the sensor 41, and accordingly the sensor 41 is not limited to the above-described thermocouple, piezoelectric sensor, or wiring circuit. The sensor 41 may be any type of sensor that can measure the physical quantity described above. An example of the sensor 41 other than the above may be a MEMS sensor. The sensor 41 may be formed only of a transducer that converts a physical quantity into an electric signal (a sensor in its narrow meaning) or may be formed of a transducer for converting a physical quantity into an electric signal and also of an amplifier and other components.

The sensor 41 may be shaped as desired. For example, the sensor 41 may be shaped like a flat plate. As viewed sideways, the flat-plate-like sensor 41 may be shaped, for example, like a rectangle (illustrated example), a circle, an ellipse, or a trapezoid. The shape of the sensor 41 is not limited to the flat plate but may be, for example, like a bar. The thickness of the sensor 41 may be determined as desired. The thickness of the sensor 41 may be the same as, or smaller than, or larger than the thickness of the wireless communication unit 42. The thickness of the sensor 41 may be, for example, 1 mm or more or 2 mm or more.

The sensor 41 may be disposed at any position. For example, the sensor 41 may be positioned closer to the first end 40*a* (illustrated example) or closer to the second end 40*b* relative to the position of the wireless communication unit 42. Moreover, the sensor 41 may be positioned closer to the third side surface 53 or to the fourth side surface 54 relative to the position of the wireless communication unit 42. For example, in the case of the sensor 41 being disposed at a position away from the tip 30, heat and vibration generated during cutting do not easily reach the sensor 41. On the other hand, for example, in the case of the sensor 41 being disposed near the tip 30, heat and vibration generated during cutting may tend to reach the sensor 41 easily. Accordingly, the sensor 41 may be disposed at the most appropriate position from a point of view, for example, of appropriate measurement of physical quantities by the sensor 41 or of durability of the sensor 41.

The wireless communication unit 42 may transmit the physical quantities measured by the sensor 41 to any device. For example, the wireless communication unit 42 may transmit data to a single external device or to two or more external devices.

The wireless communication unit 42 may be shaped as desired. For example, the wireless communication unit 42 may be shaped like a flat plate. As viewed sideways, the flat-plate-like wireless communication unit 42 may be shaped like a rectangle (illustrated example), a circle, an ellipse, or a trapezoid. The shape of the wireless communication unit 42 is not limited to the flat plate but may be, for example, like a bar.

The size of the wireless communication unit 42 may be determined as desired. For example, stable radio communication with an external device (for example, the data collection device 11) may require a large wireless communication unit 42. On the other hand, a small wireless communication unit 42 may lead, for example, to a reduction in the size of the recess 60, which leads to the size reduction of the cutting tool 20. For example, the wireless communication unit 42 may be larger than the sensor 41 (has a greater length in the front-rear direction than the sensor 41). The wireless communication unit 42, however, may be smaller than the sensor 41. For example, the wireless communication unit 42 may have a smaller length in the front-rear direction and may have a smaller length in the up-down direction compared with the sensor 41. Although the wireless communication unit 42 has the same length as the sensor 41 in the up-down direction in the illustrated example, the wireless communication unit 42 may be longer than the sensor 41 in this direction.

The thickness of the wireless communication unit 42 may be determined as desired. For example, the thickness of the wireless communication unit 42 may be 1 mm or more, 2 mm or more, or 3 mm or more, or may be 1 mm or less.

The cutting tool 20 may include a battery. For example, the battery may be coupled via wiring to the sensor 41 and/or the wireless communication unit 42 to supply electric power. The battery may be disposed inside the recess 60 together with the sensor 41 and the wireless communication unit 42 or may be disposed in a separate recess other than the recess 60 in which the sensor 41 and the wireless communication unit 42 are positioned. The battery may be connected directly to the sensor 41 and/or the wireless communication unit 42 without the wiring interposed therebetween. Moreover, the cutting tool 20 may have a plurality of batteries.

As illustrated by way of example in FIG. 4, the sensor 41 and the wireless communication unit 42 may be bonded to the base body 50 using a bonding member Bo2 (hereinafter referred to as a second bonding member Bo2). The second bonding member Bo2 may be an adhesive made of an organic material or an inorganic material. The second bonding member Bo2 may be, or need not be, electrically conductive. The material of the second bonding member Bo2 may be the same as that of the first bonding member Bo1 or may be different.

(Data Collection Device)

Refer to FIG. 1 and FIG. 2. For example, the wireless communication unit 42 may transmit the physical quantities measured by the sensor 41 to the data collection device 11. For example, the data collection device 11 may be disposed in a space in or around the machine tool Mt. For example, the data collection device 11 may include a computer. The computer may include CPU, RAM, ROM, and an external storage device. The CPU may execute a program stored in the ROM and/or the external storage device and thereby may cause a data processing unit 11a to perform various functions.

Figure 7:
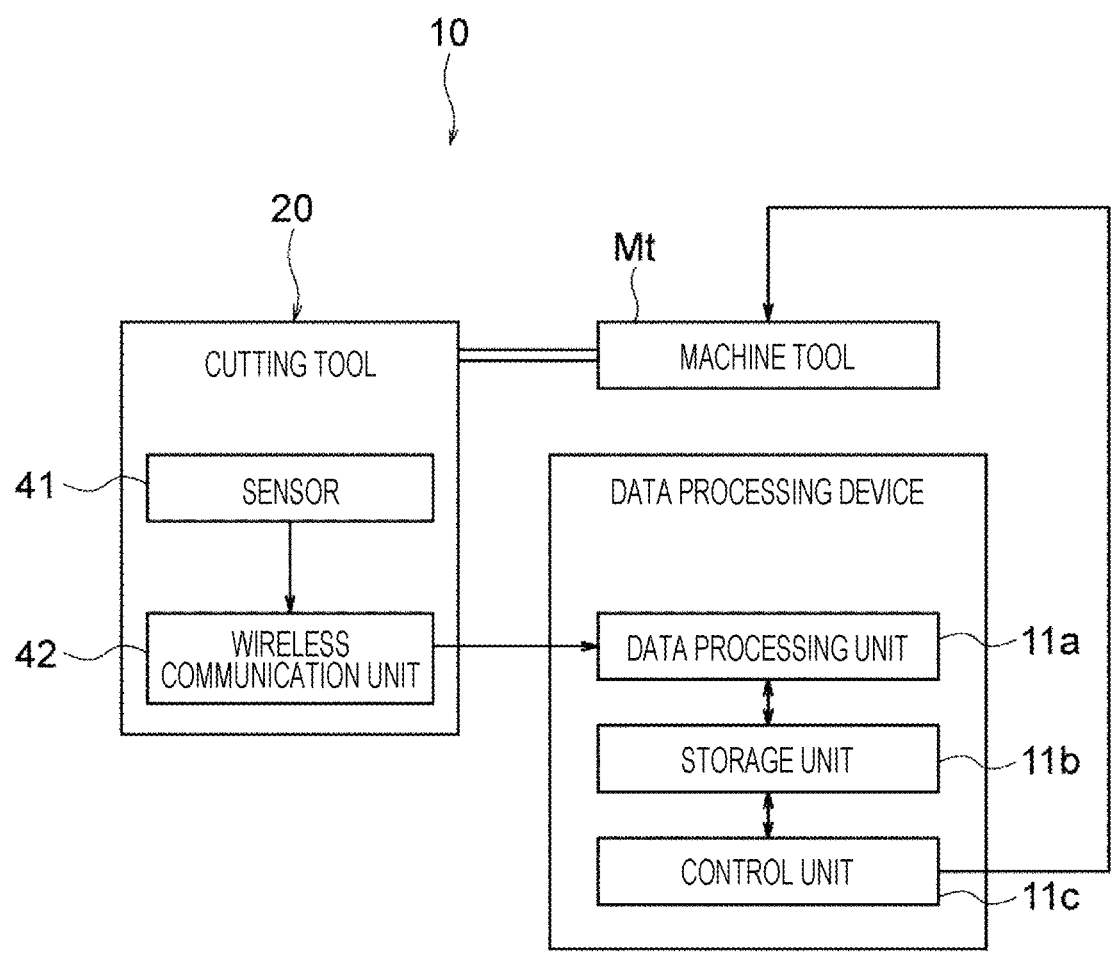
FIG. 7 is a block diagram illustrating a configuration of the data collection system.

Refer to FIG. 7. For example, the data collection device 11 may include the data processing unit 11a, a storage unit 11b, and a control unit 11c. The data processing unit 11a may have a function of data processing of the physical quantities measured by the sensor 41. The storage unit 11b may have a function to store the data processed by the data processing unit 11a. The control unit 11c may have a function to control the machine tool Mt on the basis of the data processed by the data processing unit 11a.

For example, the data processing unit 11a can store and accumulate the physical quantities measured by the sensor 41 in the storage unit 11b. The data accumulated by the data processing unit 11a may be intact physical quantities as measured by the sensor 41 or may be data different from the physical quantities measured by the sensor 41 (for example, data provided by a program that is executed in response to the physical quantities measured by the sensor 41).

For example, the control unit 11c may control the machine tool Mt, in accordance with the data accumulated in the storage unit 11b, to move the cutting tool 20 in the front-rear, right-left, and up-down directions, or to change the turning speed of the object Ob fixed to and turned by the machine tool Mt, or to display cutting conditions, cutting time, or the like on a display monitor. In addition to the control of the machine tool Mt in accordance with the data accumulated in the storage unit 11b, the control unit 11c may control the machine tool Mt in direct response to the data processed by the data processing unit 11a without using the storage unit 11b.

The data processing unit 11a, the storage unit 11b, and the control unit 11c may be disposed in the same region or may be disposed in different regions. Only the storage unit 11b and the control unit 11c may be disposed in the same region. Alternatively, only the data processing unit 11a and the storage unit 11b may be disposed in the same region.

Refer to FIG. 2 and FIG. 4. The sensor 41 may be positioned inside the recess 60 of the base body 50. The recess 60 may be closed by the cover 43 that is fixed to the base body 50. Accordingly, the region in which the sensor 41 is positioned may be surrounded (or, for example, sealed) by the inside surfaces of the recess 60 and the cover 43. This may reduce the likelihood that chips or the like generated during cutting and the oil or the like used for cutting may come into contact with the sensor 41. As a result, the cutting tool 20 that can reduce stresses imposed on the sensor 41 can be provided.

Refer to FIG. 3 and FIG. 4. Among the peripheral surfaces of the shank portion 55, the first side surface 51 may face one side in the second direction Di2, which is a direction orthogonal to the first direction Di1, and the cutting edge 31c may be positioned further toward the one side in the second direction Di2 from the first side surface 51. In addition, the entire cover 43 may be positioned further toward the other side in the second direction Di2 from the cutting edge 31c. Accordingly, the cover 43 may not readily come into contact with the object Ob when the object Ob is cut by the cutting tool 20 from the other side in the second direction Di2 (see FIG. 1). Thus, the cutting tool 20 that can reduce stresses generated during cutting due to the cover 43 approaching the object Ob can be provided.

Refer to FIG. 2 and FIG. 4. The recess 60 may open at the first side surface 51 and may be closed by the cover 43. In other words, the cover 43 may oppose the object Ob when the object Ob is cut from the other side in the second direction Dig. Also in this case, stresses generated due to the cover 43 approaching the object Ob can be relieved. In addition, for example, in the case where a cutting tool mounting base is configured to position the second side surface 52, the third side surface 53, and the fourth side surface 54, the likelihood of the cover 43 interfering with the positioning can be reduced.

The entire cover 43 may be positioned further inside the base body 50 from the outside surfaces of the base body 50. In other words, the entire cover 43 may be positioned closer than the first side surface 51 of the base body 50 to the bottom 63b of the recess 60. Put another way, the entire cover 43 may be positioned inside the recess 60. This may reduce the likelihood of the cover 43 protruding out of the base body 50. Accordingly, when the tip 30 of the cutting tool 20 is brought into contact with the object Ob, the cover 43 may not readily come into contact with the object Ob. Thus, the cutting tool 20 that can reduce stresses generated due to the cover 43 approaching the object Ob can be provided. In addition, in the case of the entire cover 43 being positioned inside the recess 60, the cover 43 may not be readily damaged by the contact with chips.

At least a portion of the cover 43 near the inside surface thereof may be accommodated in the first recess 61, and the position of the cover 43 may be set by the inner peripheral surface 61a of the first recess 61 and the first bottom 61b. Due to the first bottom 61b positioning the position of the cover 43, the cover 43 may be suppressed from moving from the first bottom 61b toward the bottom 63b of the recess 60 when the cover 43 is mounted. Thus, the cutting tool for improving work efficiency in the process of mounting the cover 43 can be provided. As can be understood from the description, in the above positioning, the inner peripheral surface 61a and the first bottom 61b do not necessarily come into direct contact with the cover 43, but the first bonding member Bo1 may be interposed therebetween.

The depth of the first recess 61 may be greater than the thickness of the cover 43. In this case, the cover 43 can be positioned further inside the recess 60. This enables the entire cover 43 to be readily positioned further toward the other side in the second direction Dig from the cutting edge 31c. In other words, when the tip 30 of the cutting tool 20 is brought into contact with the object Ob, the cover 43 may not readily come into contact with the object Ob. Thus, the cutting tool 20 that can reduce stresses generated during cutting due to the cover 43 approaching the object Ob (see FIG. 1) can be provided.

The bonding member Bo1 may be interposed between the cover 43 and surfaces inside the recess 60 of the base body 50. The cover 43 may be thereby bonded readily to the surfaces inside the recess 60. Accordingly, in the case of the cover 43 being positioned inside the recess 60 (base body 50), the cover 43 may be readily bonded to the base body 50. In other words, the cover 43 can be easily positioned in the recess 60. In addition, the bonding member Bo1 being interposed between the cover 43 and the base body 50 may reduce the likelihood, for example, of the cover 43 and the base body 50 colliding and/or rubbing against each other. Accordingly, this may reduce the likelihood, for example, of the cover 43 making an abnormal sound.

The recess 60 may have the second recess 62 of which the second bottom 62b is positioned at the second intermediate position 62b. For example, the second recess 62 may be formed in such a manner that a region stretching from the first bottom 61b to the second intermediate position 62b in the depth direction of the recess 60 may be enlarged beyond opposite sides in at least one of the directions of crossing the region compared with a region stretching from the second intermediate position 62b toward the bottom 63b of the recess 60. Moreover, a gap may be formed between the cover 43 and the second bottom 62b. For example, when the cover 43 is bonded to the base body 50 using the bonding member Bo1, this can suppress the bonding member Bo1 from flowing toward the sensor 41. In other words, this can reduce the likelihood of the bonding member Bo1 flowing toward the sensor 41 in the process of bonding the cover 43. Thus, the cutting tool 20 that can improve work efficiency in the process of assembly can be provided.

Refer to FIG. 4 and FIG. 5. The bonding member Bo1 may be interposed between the cover and surfaces inside the recess 60 of the base body 50 along the entire periphery of the opening of the recess 60. This may improve the airtightness of the recess 60. Accordingly, the sensor 41 may not be readily exposed to the oil or the like used during cutting. As a result, the cutting tool 20 that can further reduce negative impact on the sensor 41 can be provided. In addition, the airtightness can be achieved using a simple structure compared, for example, with the case in which the cover 43 is fixed by screws with a packing interposed between the cover 43 and the surfaces of the recess 60 (this case is also included in the present disclosure).

The bonding member Bo1 may be in contact with the inside surface of the cover 43. The cover 43 may be thereby brought into close contact with the surfaces inside the recess 60. In addition, this can suppress, for example, the inside surface of the cover 43 and the base body 50 from colliding and/or rubbing against each other. Accordingly, this may reduce the likelihood, for example, of the cover 43 making an abnormal sound. In addition, for example, when the cover 43 is regarded as a beam with both end portions being fixed, the distance between the supporting points may become smaller compared with the case where only the side surface of the cover 43 is fixed (this case may also be included in the present disclosure). Accordingly, the deflection of the cover 43 can be reduced.

The bonding member Bo1 may be in contact with the side surface of the cover 43. This enables the side surface 43c of the cover 43 to be in close contact with the surface inside the recess 60. In addition, this may reduce the likelihood, for example, of the side surface of the cover 43 and the base body 50 colliding and/or rubbing against each other. Accordingly, this may reduce the likelihood, for example, of the cover 43 making an abnormal sound. In addition, for example, at least part of the groove formed between the side surface of the cover 43 and the interior wall of the recess 60 may be filled with the bonding member Bo1, which reduces the likelihood of dust or the like plugging the groove.

The bonding member Bo1 may be present entirely inside the recess 60. This may reduce the likelihood of the bonding member Bo1 protruding out of the base body 50 when the cutting tool 20 is viewed from outside. For example, this can improve the appearance of the cutting tool 20. In addition, this may reduce the likelihood, for example, of the bonding member Bo1 coming into contact with the object Ob and thereby affecting the cutting.

The entire bonding member Bo1 may be positioned further toward the inside surface of the cover 43 from the outside surface of the cover 43. This may reduce the likelihood of the bonding member Bo1 protruding out from the cover 43. For example, this can improve the appearance of the cutting tool 20. This enables the entire bonding member Bo1 to be easily positioned inside the recess 60.

Refer to FIG. 6A and FIG. 6B. The surface roughness of the side surface of the cover 43 may be larger than the surface roughness of the inside surface of the cover 43. This may increase the coefficient of friction between the cover 43 and the surface inside the recess 60. Accordingly, the cover 43 may not come off easily when a force may act in a direction of removing the cover 43 from the base body 50. In addition, when the cover 43 is bonded to the base body 50 using the bonding member Bo1, the bonding member Bo1 may come into close contact with the side surface 43c of the cover 43 that has a large surface roughness, which enables the cover 43 to be bonded more strongly to the base body 50. This may improve the airtightness of the recess 60.

Refer to FIG. 6A and FIG. 6C. The surface roughness of the inner peripheral surface 61a of the first recess 61 may be larger than the surface roughness of the first side surface 51. This may increase the coefficient of friction between the cover 43 and the inner peripheral surface 61a of the first recess 61. As a result, the same advantageous effect as above can be obtained.

Refer to FIG. 1 and FIG. 7. The data collection system 10 may include the cutting tool 20 and the storage unit 11b that stores data including physical quantities measured by the sensor 41. This enables the data collection system 10 to store the data related to the cutting tool 20 measured by the sensor 41.

Refer to FIG. 2 and FIG. 4. Among the peripheral surfaces of the shank portion 55, the first side surface 51 may face one side in the second direction Di2, which is a direction orthogonal to the first direction Di1, and the fixation portion 56 may have the projection end 56b that is positioned further toward the one side in the second direction Di2 from the first side surface 51. In addition, the entire cover 43 may be positioned further toward the other side in the second direction Di2 from the projection end 56b. Accordingly, when the insert 30 for cutting is mounted on the holder 40 and brought into contact with the object Ob, the cover 43 may not easily come into contact with the object Ob. Thus, a cutting tool holder that can reduce stresses generated due to the cover 43 approaching the object Ob can be provided.

First Modification

Figure 8A:
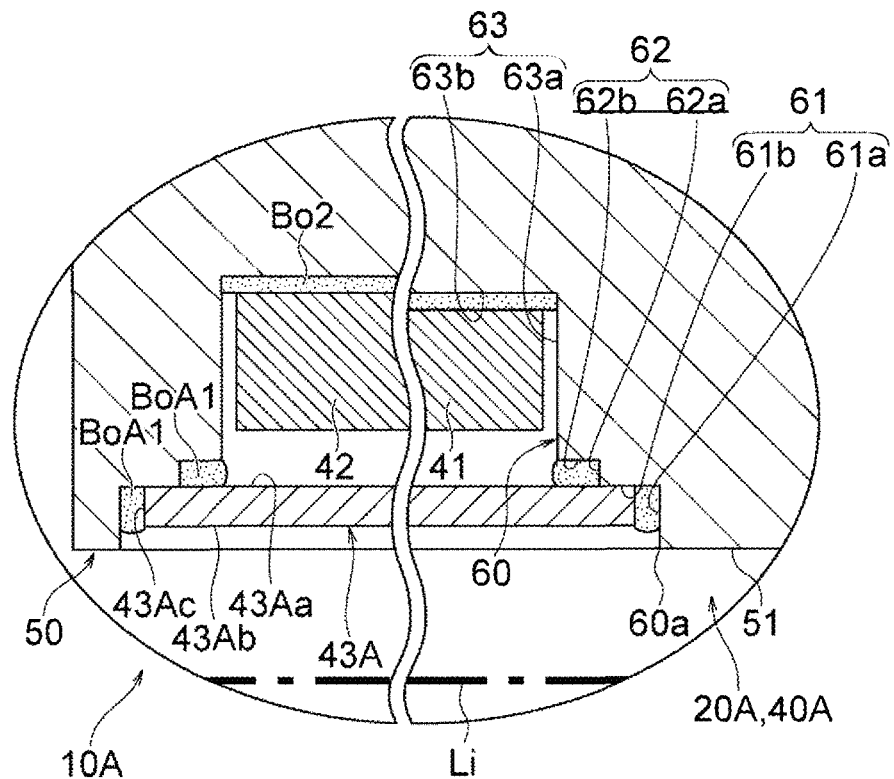
FIG. 8A is a cross-sectional view illustrating a first modification of the cutting tool of FIG. 2.

Refer to FIG. 8A. FIG. 8A may illustrate the vicinity of the recess 60 of a cutting tool 20A according to a first modification of the present disclosure. FIG. 8A may correspond to FIG. 4 above. In the embodiment, the cutting tool 20A of the first modification may be different in that a first bonding member BoA1 is interposed at a different position. Other configurations may be the same as those of the cutting tool 20 of the embodiment. The same components as described in relation to the embodiment will be denoted by the same reference signs, and detailed descriptions will be omitted.
(Cover)

A cover 43A (inside portion 43Aa) may have a portion abutting (being in contact with) the first bottom 61b. The portion of the cover 43A may abut at least a portion of the first bottom 61b. Here, "to abut the first bottom 61b" the case in which no first bonding member BoA1 is interposed between the inside portion 43Aa and the first bottom 61b and the inside portion 43Aa is in complete contact with the first bottom 61b and may also encompass the case in which the inside portion 43Aa appears to abut the first bottom 61b by visual inspection even if a small amount of the first bonding member Bo1 is present between the inside portion 43Aa and the first bottom 61b.

In the case of the portion of the cover 43A being in contact with at least a portion of the first bottom 61b as described above, the cover 43A, for example, may not protrude easily out of the base body 50. Accordingly, when the tip 30 of the cutting tool 20A is brought into contact with the object Ob, the cover 43A may not readily come into contact with the object Ob. Thus, the cutting tool 20A that can further reduce stresses generated due to the cover 43A approaching the object Ob can be provided.
(First Bonding Member)

The first bonding member BoA1 may be present along the periphery of the opening 60a of the recess 60 between the first interior wall 61a and the side portion 43Ac and also between the second bottom 62b and the inside portion 43Aa. For example, the first bonding member BoA1 being present between the first interior wall 61a and the side portion 43Ac may be bonded to the first interior wall 61a, the side portion 43Ac, and the first bottom 61b. For example, the first bonding member BoA1 being present between the second bottom 62b and the inside portion 43Aa may be bonded to the second interior wall 62a, the inside portion 43Aa, and the second bottom 62b.

Second Modification

Figure 8B:
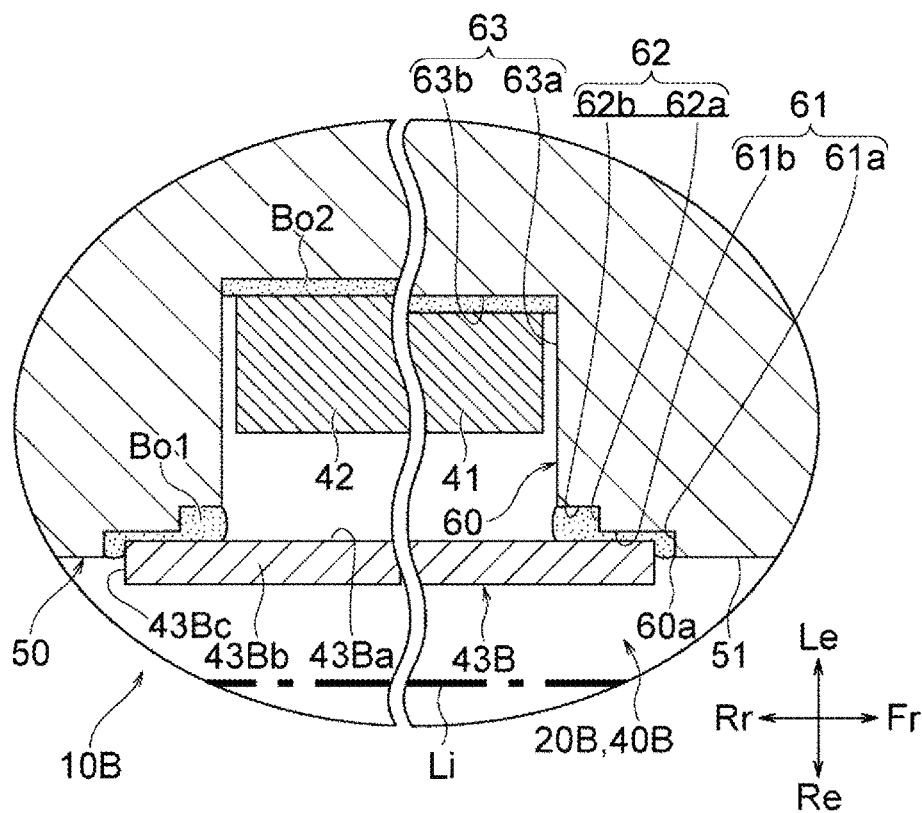
FIG. 8B is a cross-sectional view illustrating a second modification of the cutting tool of FIG. 2.

Refer to FIG. 8B. FIG. 8B may illustrate the vicinity of the recess 60 of a cutting tool 20B according to a second modification of the present disclosure. FIG. 8B may correspond to FIG. 4 above. In the embodiment, the cutting tool 20B illustrated in FIG. 8B may be different in that a cover 43B protrudes out of the base body 50. The same components as described previously will be denoted by the same reference signs, and detailed descriptions will be omitted.
(Cover)

A portion of the cover 43B near the inside portion 43Ba thereof may be positioned inside the recess 60 (first recess 61) and a portion of the cover 43B near an outside portion 43Bb thereof may be positioned outside the recess 60. Put another way, at least a portion of the cover 43B may be present inside the recess 60. The ratio of the portion of the cover 43B present inside the recess 60 may be determined as desired. For example, the ratio of the portion of the cover 43B present in the recess 60 to the total volume of the cover 43B may be 90% or more, 70% or more, or 50% or more. A portion of less than 50% of the total volume of the cover 43 may be present inside the recess 60.

Third Modification

Figure 9:
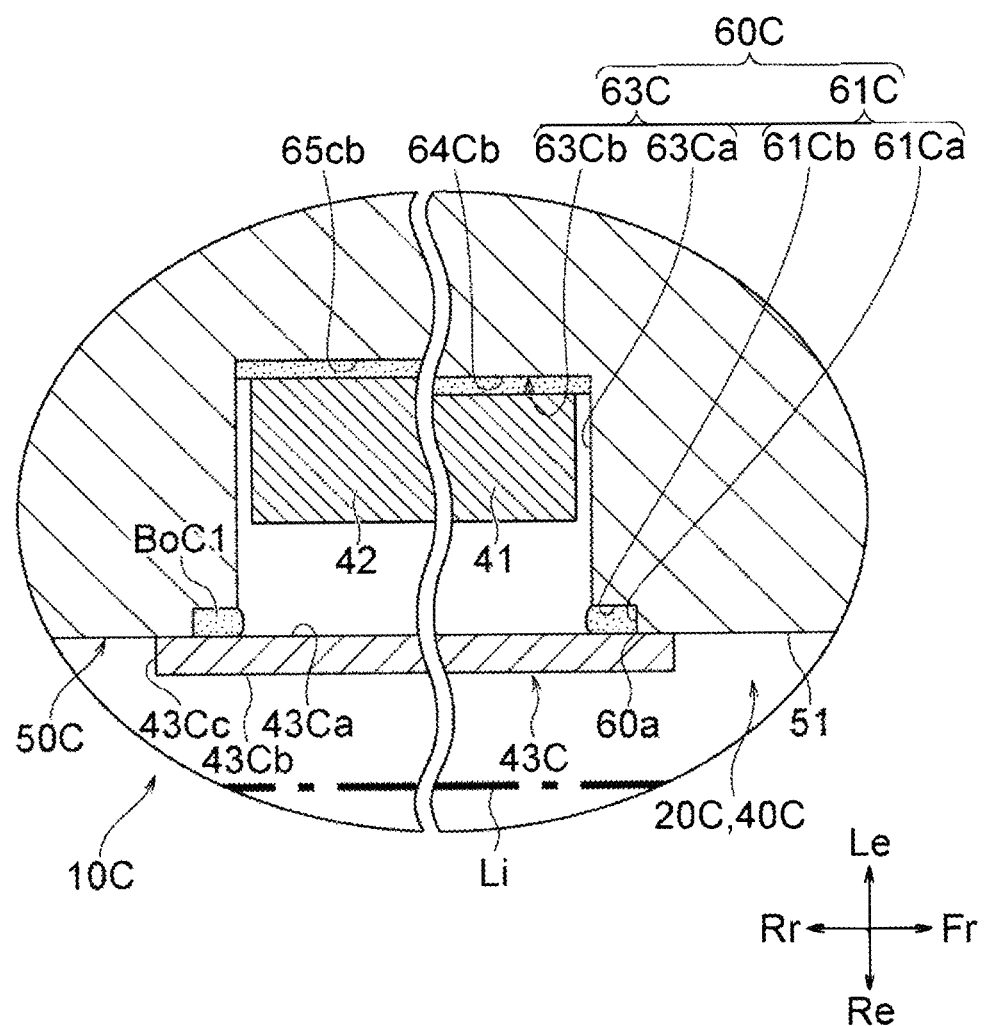
FIG. 9 is a cross-sectional view illustrating a third modification of the cutting tool of FIG. 2.

Refer to FIG. 9. FIG. 9 may illustrate the vicinity of a recess 60C of a cutting tool 20C according to a third modification of the present disclosure. FIG. 9 may correspond to FIG. 4 above. In the embodiment, the cutting tool 20C illustrated in FIG. 9 may be different in that a cover 43C is present outside a base body 50C and the recess 60C is formed of a first recess 61C and a third recess 63C. The same components as described previously will be denoted by the same reference signs, and detailed descriptions will be omitted.
(Recess)

The recess 60C may have the first recess 61C and the third recess 63C. The first recess 61C may be recessed toward the second side surface 52 and may open at the first side surface 51. The third recess 63C may be recessed toward the second side surface 52 and may open at a first bottom 61Cb of the first recess 61C.

The first recess 61C may have a first interior wall 61Ca and the first bottom 61Cb. The first interior wall 61Ca may extend from the opening 60a at the first side surface 51 toward a third bottom 63Cb of the third recess 63C. The first bottom 61Cb may be connected to the first interior wall 61Ca and be the bottom of the first recess 61C. The third recess 63C may have a third interior wall 63Ca and the third bottom 63Cb. The third interior wall 63Ca may extend from the opening at the first bottom 61Cb to the third bottom 63Cb. The third bottom 63Cb may be connected to the third interior wall 63Ca and be the bottom of the third recess 63C.

A first bonding member BoC1 may be present between an inside portion 43Ca and the first bottom 61Cb. The first bonding member BoC1 may be bonded to the inside portion 43Ca, the first interior wall 61Ca, and the first bottom 61Cb.
(Cover)

The cover 43C, for example, may be positioned outside the recess 60C and fixed to the base body 50C by the first bonding member BoC1 being present inside the recess 60C. The width of the cover 43C (length in the third direction Di3) may be greater than the width of the first recess 61C. For example, the ratio of the width of the cover 43C to the width of the first recess 61C may be 1.1 times or more, 1.2 times or more, 1.3 times or more. Moreover, the length of the cover 43C (length in the front-rear direction) may be greater than the length of the first recess 61C. The ratio of the length of the cover 43C to the length of the first recess 61C may be 1.1 times or more, 1.2 times or more, or 1.3 times or more.

The cutting tool, the data collection device, and the holder of the present disclosure are not limited to those described in the embodiment and the modifications but may be implemented in various different forms. Some examples of modified forms of cutting tool, the data collection device, and the holder may be presented below.

For example, the cutting tool using a replaceable tip, or otherwise referred to as a throw away tip, has been described in the above embodiment. The cutting tool of the present disclosure, for example, may be a cutting tool (cutting tool having an irreplaceable tip), such as a tipped tool or a brazed tool, in which a tip is joined to the base body (holder). It has been described above that the replaceable tip is mounted/dismounted using the clamp. The replaceable tip, however, may be mounted using a screw to be inserted into the tip.

For example, the cutting tool of the embodiment illustrated in the drawings may be a left-hand cutting tool. The cutting tool of the present disclosure, however, is not limited to the left-hand cutting tool. The cutting tool of the present disclosure can be applied also to a right-hand cutting tool or a neutral cutting direction tool usable for both right-hand cutting and left-hand cutting.

For example, the recess that opens at the first side surface has been described in the embodiment. The recess, however, may open at any surface (any of side surfaces and end surfaces) of the base body. For example, the recess may open at the third side surface and be recessed with a certain depth toward the fourth side surface, or alternatively the recess may open at the second side surface and be recessed with a certain depth toward the first side surface.

For example, the cutting tool has been described in the embodiment as having the sensor and the wireless communication unit that are disposed in the recess as separate components. The sensor and the wireless communication unit, however, may be formed as a single component. Moreover, the wireless communication unit is not an indispensable component and may be discarded if necessary. For example, at least part of the wiring that is electrically connected to the sensor may be present outside the cutting tool and connected to an external device. In other words, the data measured by the sensor may be output to the external device via the wiring.

The invention claimed is:

1. A cutting tool, comprising:
  a base body comprising:
    a shank portion extending in a first direction from a first end of the shank portion to a second end of the shank portion, the shank portion including
      a first outer side surface having a recess and extending from the first end to the second end, and
      a second outer side surface opposite to the first outer side surface in a second direction orthogonal to the first direction, the second direction being from the second outer side surface toward the first outer side surface, and the second outer side surface extending from the first end to the second end, and
    a fixation portion positioned at the second end of the shank portion;
  a tip being fixed to the fixation portion and comprising a cutting edge;
  a sensor positioned inside the recess;
  a wireless communicator positioned inside the recess, and configured to transmit data measured by the sensor to an external device;
  a cover closing the recess; and
  a bonding member interposed between the cover and the base body, wherein
  the recess includes:
    a first recess at the first outer side surface and including a first bottom surface, and
    a second recess at the first bottom surface and including a second bottom surface positioned further inward than the first bottom surface in the second direction,
  the cutting edge is positioned outward with respect to the first outer side surface in the second direction, an entirety of the cover is positioned inward of the cutting edge in the second direction, and
the bonding member is interposed between the cover and the second bottom surface.

2. The cutting tool according to claim 1, wherein
as viewed in the first direction, the tip comprises
  a rake face that faces in a third direction that is a direction orthogonally intersecting both the first direction and the second direction, and
  a flank face that intersects the rake face with the cutting edge interposed at a border therebetween, faces away from the shank portion, and inclines at a predetermined relief angle with respect to the third direction.

3. The cutting tool according to claim 1, wherein
the entirety of the cover is positioned further inside the shank portion with respect to the first outer side surface.

4. The cutting tool according to claim 1, wherein
a depth of the first recess along the second direction is greater than a thickness of the cover along the second direction.

5. The cutting tool according to claim 1, wherein
the cover abuts at least a portion of the first bottom surface.

6. The cutting tool according to claim 1, wherein
the bonding member is interposed between the cover and the base body along an entire periphery of an opening of the recess.

7. The cutting tool according to claim 1, wherein
the bonding member is in contact with an inside surface of the cover.

8. The cutting tool according to claim 1, wherein
the bonding member is in contact with a side surface of the cover.

9. The cutting tool according to claim 1, wherein
an entirety of the bonding member is present inside the recess.

10. The cutting tool according to claim 1, wherein
an entirety of the bonding member is positioned inward than an outside surface of the cover in the second direction.

11. The cutting tool according to claim 8, wherein
a surface roughness of the side surface of the cover is larger than a surface roughness of an inside surface of the cover.

12. The cutting tool according to claim 1, wherein
a surface roughness of an inner peripheral surface of the first recess is larger than a surface roughness of the first side surface.

13. A data collection system comprising:
the cutting tool according to claim 1; and
a storage unit that stores data of physical quantity measured by the sensor.

14. The cutting tool according to claim 1, wherein
the recess further comprises a third recess at the second bottom surface and including a third bottom surface further inward than the second bottom surface in the second direction, and
the sensor is positioned inside the third recess.

15. The cutting tool according to claim 14, wherein
the wireless communicator is configured to
  obtain the data measured by the sensor via a wiring, wherein the data contains a physical quantity measured by the sensor, and
  transmit the data to, as the external device, an external data collection device, wherein the third bottom surface comprises:
- a first bonding surface on which the sensor is mounted via the bonding member; and
- a second bonding surface on which the wireless communicator is mounted via the bonding member, and the first bonding surface is positioned outward than the second bonding surface in the second direction.

16. A cutting tool, comprising:
a base body comprising:
- a shank portion extending in a first direction from a first end of the shank portion to a second end of the shank portion, the shank portion including
  - a first outer side surface having a recess and extending from the first end to the second end, and
  - a second outer side surface opposite to the first outer side surface in a second direction orthogonal to the first direction, the second direction being from the second outer side surface toward the first outer side surface, and the second outer side surface extending from the first end to the second end, and
- a fixation portion positioned at the second end of the shank portion;

a tip being fixed to the fixation portion and comprising a cutting edge;
a sensor positioned inside the recess;
a cover closing the recess; and
a bonding member interposed between the cover and the base body, wherein
the recess includes:
- a first recess at the first outer side surface and including a first bottom surface, and
- a second recess at the first bottom surface and including a second bottom surface positioned further inward than the first bottom surface in the second direction, the cutting edge is positioned outward with respect to the first outer side surface in the second direction, an entirety of the cover is positioned inward of the cutting edge in the second direction, and the bonding member is interposed between the cover and the second bottom surface.

17. A cutting tool, comprising:
a base body comprising:
- a shank portion extending in a first direction from a first end of the shank portion to a second end of the shank portion, the shank portion including
  - a first outer side surface having a recess and extending from the first end to the second end, and
  - a second outer side surface opposite to the first outer side surface in a second direction orthogonal to the first direction, the second direction being from the second outer side surface toward the first outer side surface, and the second outer side surface extending from the first end to the second end, and
- a fixation portion positioned at the second end of the shank portion;

a tip being fixed to the fixation portion and comprising a cutting edge;
a sensor positioned inside the recess;
a wireless communicator positioned inside the recess, and configured to transmit data measured by the sensor to an external device; and
a cover closing the recess, wherein
the recess includes:
- a first recess at the first outer side surface and including a first bottom surface, and
- a second recess at the first bottom surface and including a second bottom surface positioned further inward than the first bottom surface in the second direction, the cutting edge is positioned outward with respect to the first outer side surface in the second direction, and an entirety of the cover is positioned inward of the cutting edge in the second direction.

* * * * *